United States Patent
Suematsu et al.

(10) Patent No.: US 9,105,889 B2
(45) Date of Patent: Aug. 11, 2015

(54) METHOD AND APPARATUS FOR DETERMINING HUMIDITY STATES OF INDIVIDUAL CELLS IN A FUEL CELL, METHOD AND APPARATUS FOR CONTROLLING HUMIDITY STATES OF INDIVIDUAL CELLS IN A FUEL CELL, AND A FUEL CELL SYSTEM

(75) Inventors: Keigo Suematsu, Toyota (JP);
Tomotaka Ishikawa, Aichi-gun (JP);
Yoshiaki Naganuma, Toyota (JP);
Hiroyuki Katsuda, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 898 days.

(21) Appl. No.: 13/260,039

(22) PCT Filed: Nov. 18, 2009

(86) PCT No.: PCT/JP2009/069527
§ 371 (c)(1),
(2), (4) Date: Sep. 23, 2011

(87) PCT Pub. No.: WO2011/061817
PCT Pub. Date: May 26, 2011

(65) Prior Publication Data
US 2012/0015263 A1     Jan. 19, 2012

(51) Int. Cl.
*H01M 8/04* (2006.01)
*H01M 8/10* (2006.01)

(52) U.S. Cl.
CPC ........ *H01M 8/04126* (2013.01); *H01M 8/0485* (2013.01); *H01M 8/04492* (2013.01); *H01M 8/04529* (2013.01); *H01M 8/04559* (2013.01); *H01M 8/04589* (2013.01); *H01M 8/04619* (2013.01); *H01M 8/04641* (2013.01); *H01M 8/04828* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

2009/0191437 A1*  7/2009  Maeshima et al. .............. 429/23
2009/0286109 A1  11/2009  Araki

FOREIGN PATENT DOCUMENTS

| CN | 101243571 A | 8/2008 |
|---|---|---|
| JP | 05-047394 A | 2/1993 |
| JP | 2002-164065 A | 6/2002 |
| JP | 2004-311149 A | 11/2004 |
| JP | 2005-063801 A | 3/2005 |
| JP | 2005-100975 A | 4/2005 |

(Continued)

OTHER PUBLICATIONS

International Search Report mailed Feb. 23, 2010 of PCT/JP2009/069527.

*Primary Examiner* — Patrick Ryan
*Assistant Examiner* — Wyatt McConnell
(74) *Attorney, Agent, or Firm* — Kenyon & Kenyon LLP

(57) ABSTRACT

In order to cause a plurality of cells in a fuel cell to be recovered to a desired humidity state, it is configured to determine that the cells present a mixture of dry and overly humid states in the case where a predetermined condition is satisfied, and in the case where it is determined that the cells present the mixture, humidifying control is carried out to cause all the cells to attain the overly humid state, and thereafter, drying control is carried out to dry all the cells, to thereby cause the plurality of cells to be recovered to a predetermined humidity state.

23 Claims, 10 Drawing Sheets

(56) References Cited

FOREIGN PATENT DOCUMENTS

| | | |
|---|---|---|
| JP | 2006-032094 A | 2/2006 |
| JP | 2007-012429 A | 1/2007 |
| JP | 2007-194177 A | 8/2007 |
| JP | 2008-041625 A | 2/2008 |
| JP | 2008-288066 A | 11/2008 |
| JP | 2009-231225 A | 10/2009 |
| WO | 2009/005158 A1 | 1/2009 |

* cited by examiner

FIG.10

$$v_1 : v_2 = \frac{n}{\sqrt{P_1}} : \frac{n_{all} - n}{\sqrt{P_2}} \quad \text{----- (1)}$$

$$Q = \frac{n \cdot v_1 + (n_{all} - n) \cdot v_2}{n_{all}} \cdot S \quad \text{----- (2)}$$

METHOD AND APPARATUS FOR DETERMINING HUMIDITY STATES OF INDIVIDUAL CELLS IN A FUEL CELL, METHOD AND APPARATUS FOR CONTROLLING HUMIDITY STATES OF INDIVIDUAL CELLS IN A FUEL CELL, AND A FUEL CELL SYSTEM

This is a 371 national phase application of PCT/JP2009/069527 filed 18 Nov. 2009, the contents of which are incorporated herein by reference.

TECHNICAL FIELD

The present invention relates to a method and apparatus for determining humidity states of individual cells in a fuel cell, a method and apparatus for controlling humidity states of individual cells in a fuel cell, and a fuel cell system.

BACKGROUND ART

In order to efficiently generate electricity using a polymer electrolyte fuel cell for example, it is important that a plurality of individual cells stacked on one another each contain moisture in an appropriate amount that is not too small or not too large. To this end, conventionally, a dry state or an overly humid state of a cell has been detected from a cell voltage or the like, and the humidity of the cell has been controlled on the basis of the detected state, so as to be recovered to an appropriate humidity level (Patent Documents 1 and 2). Patent Documents 3 through 6 disclose related techniques.

PRIOR ART REFERENCES

Patent Documents

[Patent Document 1] Japanese Patent Application Laid-Open No. 2008-041625
[Patent Document 2] Japanese Patent Application Laid-Open No. 2007-194177
[Patent Document 3] Japanese Patent Application Laid-Open No. 2008-288066
[Patent Document 4] Japanese Patent Application Laid-Open No. 2007-12429
[Patent Document 5] Japanese Patent Application Laid-Open No. 2004-311149
[Patent Document 6] Japanese Patent Application Laid-Open No. 2005-63801

DISCLOSURE OF THE INVENTION

Problem to be Solved by the Invention

In practice, however, a large number of stacked cells may include some cells in a dry state and others in an overly humid state due to the variation in gas supply pressure or the like. In such a situation, if the control which is generally made in the dry state as described above is conducted in order to increase the humidity in all the cells, or if the control which is generally made in the overly humid state as described above is conducted in order to decrease the humidity in all the cells, some of the cells may rather suffer deterioration in terms of the humidity state. As a result, not all the individual cells in the fuel cell may be recovered to an appropriate humidity state.

In view of the foregoing, an object of the present invention is to provide a method and apparatus for determining humidity states of individual cells in a fuel cell, a method and apparatus for controlling humidity states of individual cells in a fuel cell, and a fuel cell system, which enable the individual cells to be recovered to an appropriate humidity state.

Means for Solving the Problem

In order to achieve the above object, the present invention provides a method for determining humidity states of a plurality of cells stacked in a fuel cell, which method includes the step of determining that the cells present a mixture of dry and overly humid states in the case where at least one of the following conditions 1 through 3 is satisfied. Condition 1: voltage deviation among the plurality of cells is equal to or more than a predetermined threshold value, and a minimum cell voltage is equal to or less than a predetermined threshold value. Condition 2: the minimum cell voltage is equal to or less than the predetermined threshold value, and electricity generated by and output from the fuel cell is equal to or less than a predetermined threshold value. Condition 3: the minimum cell voltage is equal to or less than the predetermined threshold value, and an electric current at an air inlet on a cathode side of the cell is equal to or less than a predetermined threshold value.

According to the present invention, it is determined that the cells present the mixture of the dry and overly humid states in the case where any of the above-described conditions 1 through 3 is satisfied. This enables the mixture state to be recognized and addressed as appropriate. As a result, even in the case where the individual cells in the fuel cell vary in humidity state, the cells can be recovered to an appropriate humidity state.

In the above-described method for determining the humidity states of the cells in the fuel cell, it may be configured such that the determination is refrained from being made during a starting period of the fuel cell, during a high-load operation of the fuel cell, and during stop processing of the fuel cell.

Furthermore, in the method for determining the humidity states of the cells in the fuel cell, it may be configured such that it is determined that the cells present the mixture of the dry and overly humid states in the case where, in addition to at least one of the conditions 1 through 3, a condition that a difference between the impedance value of the center cell and the impedance value of the end cell is equal to or greater than a predetermined threshold value is satisfied.

According to another aspect, the present invention provides a method for controlling humidity states of a plurality of cells stacked in a fuel cell, which method includes the steps of: determining that the cells present a mixture of dry and overly humid states in the case where at least one of conditions 1 through 3 stated below is satisfied; and in the case where it is determined that the cells present the mixture, performing humidifying control to cause all the cells to attain the overly humid state, and then performing drying control to dry all the cells, to thereby cause the plurality of cells to be recovered to a predetermined humidity state, wherein the conditions 1 through 3 are as follows. Condition 1: voltage deviation among the plurality of cells is equal to or more than a predetermined threshold value, and a minimum cell voltage is equal to or less than a predetermined threshold value. Condition 2: the minimum cell voltage is equal to or less than the predetermined threshold value, and electricity generated by and output from the fuel cell is equal to or less than a predetermined threshold value. Condition 3: the minimum cell voltage is equal to or less than the predetermined threshold value, and an electric current at an air inlet on a cathode side of the cell is equal to or less than a predetermined threshold value.

According to the present invention, the mixture state of the dry and overly humid states is determined, and then, the humidifying control and the drying control are carried out in this order so as to allow the humidity of the plurality of cells to be recovered. This ensures that the plurality of cells are properly recovered to an appropriate humidity state.

In the above-described method for controlling the humidity states of the cells in the fuel cell, it may be configured such that the determination is refrained from being made during a starting period of the fuel cell, during a high-load operation of the fuel cell, and during stop processing of the fuel cell.

In the above-described method for controlling the humidity states of the cells in the fuel cell, it may be configured such that it is determined that the cells present the mixture of the dry and overly humid states in the case where, in addition to at least one of the conditions 1 through 3, a condition that a difference between an impedance value of the cell at the center in a stack direction and an impedance value of the cell at an end in the stack direction is equal to or greater than a predetermined threshold value is satisfied.

Furthermore, in the above-described method for controlling the humidity states of the cells in the fuel cell, it may be configured such that a drop of cell voltage is permitted in the humidifying control.

In the humidifying control, it may be configured to control at least one of air stoichiometric ratio on a cathode side of the cell, air back-pressure, temperature of cooling water of the fuel cell, and electricity generated by and output from the fuel cell.

In the humidifying control, the air stoichiometric ratio may be adjusted to cause moisture to be discharged from within the cell, to thereby avoid insufficient air supply caused by water clogging in an air passage in the cell.

In the humidifying control, movement of moisture from a cathode side to an anode side in the cell may be restricted so as to avoid insufficient hydrogen gas supply caused by water clogging in a hydrogen gas passage in the cell. Furthermore, a hydrogen gas pressure on the anode side of the cell may be increased so as to restrict the movement of the moisture.

In the humidifying control, discharge of water may be promoted on an anode side of the cell so as to avoid insufficient hydrogen gas supply caused by water clogging in a hydrogen gas passage in the cell.

For promoting the discharge of water, at least one of the measures of: increasing a hydrogen gas stoichiometric ratio on the anode side of the cell, increasing a water temperature, and increasing the frequency of purge may be taken.

The drying control may be performed by air purge control, and the amount of purge used in the air purge control may be set to ensure both an air flow velocity which can expel water from within the cell and the quantity of air which can expel all the water contained in any cell suffering a drop of cell voltage.

According to yet another aspect, the present invention provides an apparatus for determining humidity states of a plurality of cells stacked in a fuel cell, which apparatus determines that the cells present a mixture of dry and overly humid states in the case where at least one of the following conditions 1 through 3 is satisfied. Condition 1: voltage deviation among the plurality of cells is equal to or more than a predetermined threshold value, and a minimum cell voltage is equal to or less than a predetermined threshold value. Condition 2: the minimum cell voltage is equal to or less than the predetermined threshold value, and electricity generated by and output from the fuel cell is equal to or less than a predetermined threshold value. Condition 3: the minimum cell voltage is equal to or less than the predetermined threshold value, and an electric current at an air inlet on a cathode side of the cell is equal to or less than a predetermined threshold value.

In the above-described apparatus for determining the humidity states of the cells in the fuel cell, it may be configured such that the determination is refrained from being made during a starting period of the fuel cell, during a high-load operation of the fuel cell, and during stop processing of the fuel cell.

Furthermore, it may be configured such that it is determined that the cells present the mixture of the dry and overly humid states in the case where, in addition to at least one of the conditions 1 through 3, a condition that a difference between an impedance value of the cell at the center in a stack direction and an impedance value of the cell at an end in the stack direction is equal to or greater than a predetermined threshold value is satisfied.

According to yet another aspect, the present invention provides an apparatus for controlling humidity states of a plurality of cells stacked in a fuel cell, which apparatus determines that the cells present a mixture of dry and overly humid states in the case where at least one of conditions 1 through 3 stated below is satisfied; and in the case where it is determined that the cells present the mixture, the apparatus performs humidifying control to cause all the cells to attain the overly humid state, and then performs drying control to dry all the cells, to thereby cause the plurality of cells to be recovered to a predetermined humidity state, wherein the conditions 1 through 3 are as follows. Condition 1: voltage deviation among the plurality of cells is equal to or more than a predetermined threshold value, and a minimum cell voltage is equal to or less than a predetermined threshold value. Condition 2: the minimum cell voltage is equal to or less than the predetermined threshold value, and electricity generated by and output from the fuel cell is equal to or less than a predetermined threshold value. Condition 3: the minimum cell voltage is equal to or less than the predetermined threshold value, and an electric current at an air inlet on a cathode side of the cell is equal to or less than a predetermined threshold value.

In the above-described apparatus for controlling the humidity states of the cells in the fuel cell, it may be configured such that the determination is refrained from being made during a starting period of the fuel cell, during a high-load operation of the fuel cell, and during stop processing of the fuel cell.

Furthermore, it may be configured such that it is determined that the cells present the mixture of the dry and overly humid states in the case where, in addition to at least one of the conditions 1 through 3, a condition that a difference between an impedance value of the cell at the center in a stack direction and an impedance value of the cell at an end in the stack direction is equal to or greater than a predetermined threshold value is satisfied.

In the humidifying control, it may be configured such that a drop of cell voltage is permitted.

In the humidifying control, it may be configured to control at least one of air stoichiometric ratio on a cathode side of the cell, air back-pressure, temperature of cooling water of the fuel cell, and electricity generated by and output from the fuel cell.

In the humidifying control, the air stoichiometric ratio may be adjusted to cause moisture to be discharged from within the cell, to thereby avoid insufficient air supply caused by water clogging in an air passage in the cell.

In the humidifying control, movement of moisture from a cathode side to an anode side in the cell may be restricted so as to avoid insufficient hydrogen gas supply caused by water clogging in a hydrogen gas passage in the cell.

It may also be configured to increase a hydrogen gas pressure on the anode side of the cell so as to restrict the movement of the moisture.

In the humidifying control, discharge of water may be promoted on an anode side of the cell so as to avoid insufficient hydrogen gas supply caused by water clogging in a hydrogen gas passage in the cell.

For promoting the discharge of water, at least one of the measures of: increasing a hydrogen gas stoichiometric ratio on the anode side of the cell, increasing a water temperature, and increasing the frequency of purge may be taken.

The drying control may be performed by air purge control, and the amount of purge used in the air purge control may be set to ensure both an air flow velocity which can expel water from within the cell and the quantity of air which can expel all the water contained in any cell suffering a drop of cell voltage.

According to yet another aspect, the present invention provides a fuel cell system including a fuel cell and the above-described apparatus for determining the humidity states of the cells in the fuel cell.

Furthermore, according to yet another aspect, the present invention provides a fuel cell system including a fuel cell and the above-described apparatus for controlling the humidity states of the cells in the fuel cell.

BRIEF DESCRIPTION OF THE DRAWINGS

FIG. 10 shows expressions for calculating the air flow velocity and the quantity of air for purging.

MODE FOR CARRYING OUT THE INVENTION

Hereinafter, a preferred embodiment of the present invention will be described with reference to the accompanying drawings.

Figure 1:
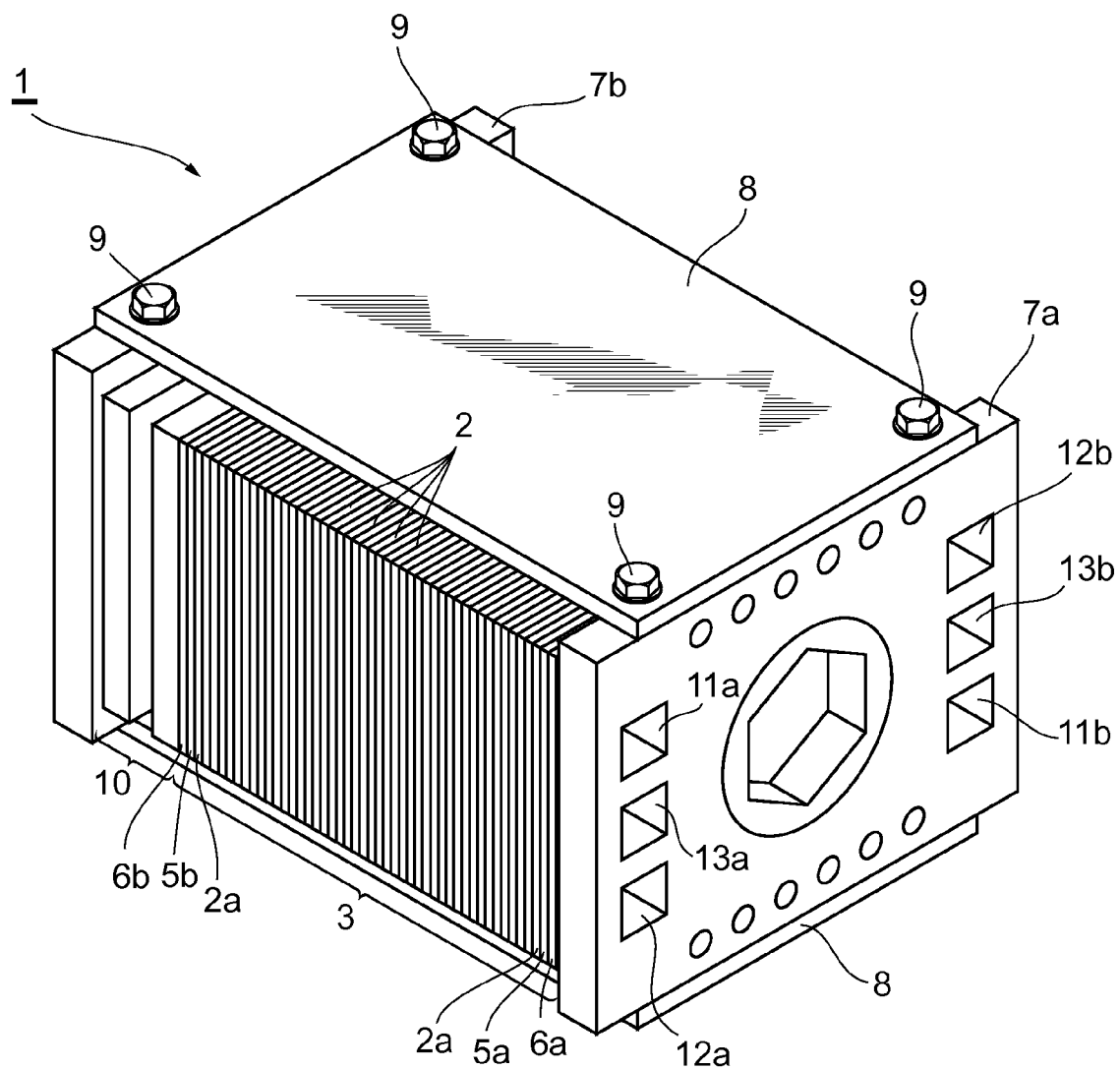
FIG. 1 is a perspective view of a fuel cell.
Figure 2:
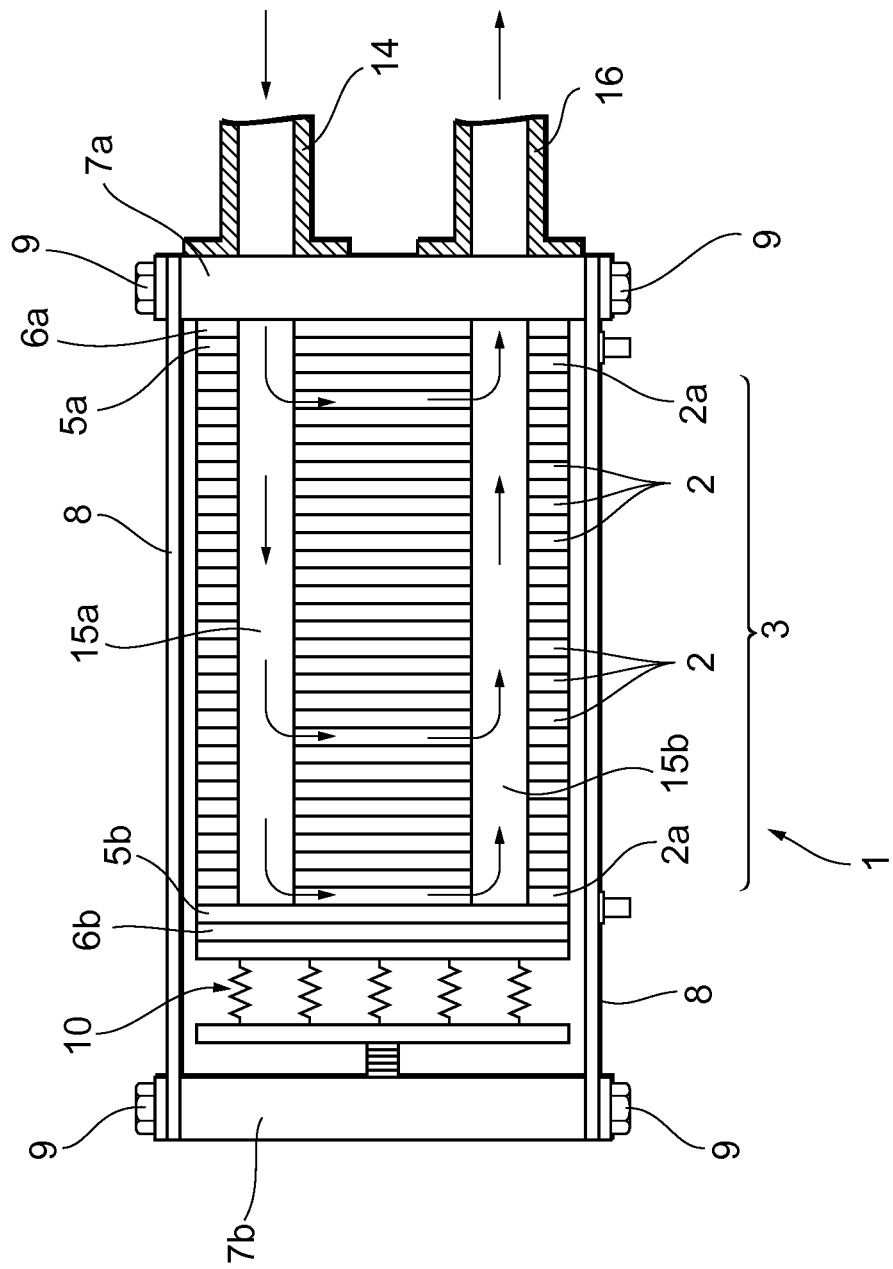
FIG. 2 is a side view showing a part of the interior of the fuel cell.

As shown in FIGS. 1 and 2, a fuel cell 1 having a stack structure includes a fuel cell stack 3 which is made up of a plurality of solid polymer electrolyte type unit cells 2 stacked on one another. On the outer sides of the unit cells 2 (end cells 2a) provided at both ends of the fuel cell stack 3, current collectors 5a and 5b, insulating plates 6a and 6b, and end plates 7a and 7b are arranged respectively. Tension plates 8 and 8 have their respective ends fixedly secured by bolts 9 to the end plates 7a and 7b. An elastic module 10 is provided between the end plate 7b and the insulating plate 6b.

The end plate 7a is provided with supply ports 11a, 12a, and 13a, which are connected with corresponding supply pipes 14 so as to allow a hydrogen gas as a fuel gas, air as an oxidizing gas, and a coolant to be supplied through the supply pipes 14 to corresponding manifolds 15a in the fuel cell stack 3. Each manifold 15a communicates with another manifold 15b in the fuel cell stack 3 through the unit cells 2. The hydrogen gas, the air, and the coolant supplied to the manifolds 15a flow in a planar direction through passages provided in the cells 2, which will be described later, to reach the manifolds 15b. The manifolds 15b communicate with corresponding discharge pipes 16 which are connected to discharge ports 11b, 12b, and 13b provided on the end plate 7a, so that the hydrogen gas, the air, and the coolant are discharged through the discharge pipes 16 to the outside of the fuel cell 1. While the supply pipe 14, the manifolds 15a and 15b, and the discharge pipe 16 are provided for each fluid of hydrogen gas, air, and coolant, they are denoted by the common symbols in FIG. 2 for simplification of illustration.

Figure 3:
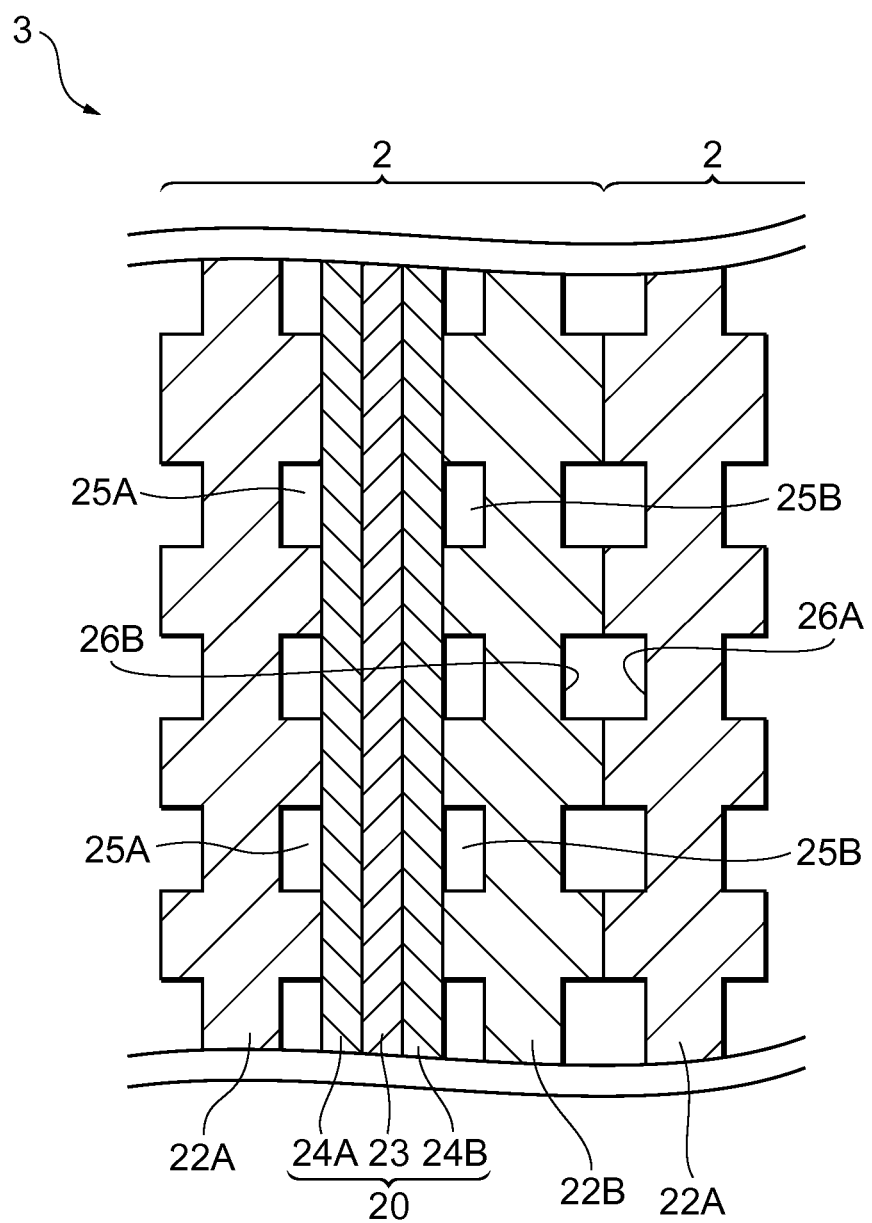
FIG. 3 is a cross-sectional view of a unit cell.

As shown in FIG. 3, each unit cell 2 includes an MEA 20 and a pair of separators 22A and 22B. The MEA 20 (membrane electrode assembly) includes an anode electrode 24A, a cathode electrode 24B, and an electrolyte membrane 23, made up of an ion-exchange membrane, interposed between the anode and cathode electrodes. A hydrogen gas passage 25A provided in the separator 22A is configured to face the anode electrode 24A, while an air passage 25B provided in the separator 22B is configured to face the cathode electrode 24B. Coolant passages 26A and 26B provided in the separators 22A and 22B in the neighboring unit cells 2 and 2 communicate with each other.

Figure 4:
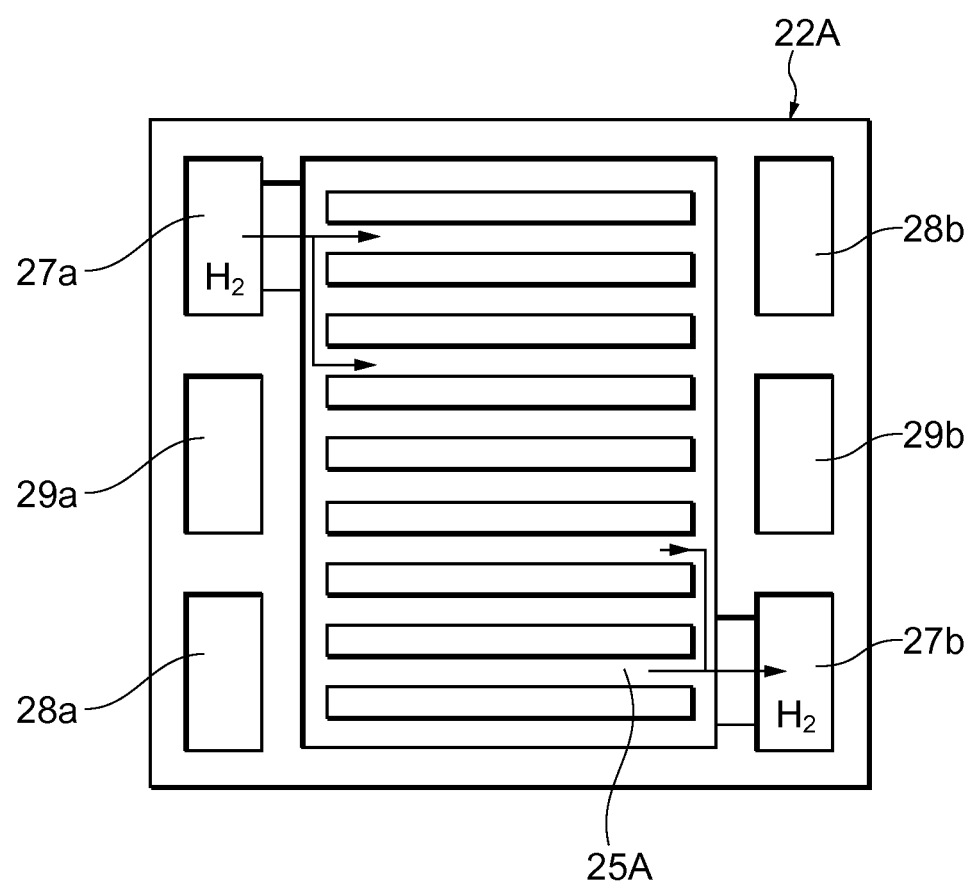
FIG. 4 is a plan view of a separator.

FIG. 4 is a plan view of the separator 22A. The separator 22A has a hydrogen gas inlet 27a, an air inlet 28a, a coolant inlet 29a, a hydrogen gas outlet 27b, an air outlet 28b, and a coolant outlet 29b which are formed on the outer sides of the hydrogen gas passage 25A to penetrate through the separator 22A in its thickness direction. The inlets 27a, 28a, and 29a each constitute a part of the manifold 15a for the corresponding fluid. Similarly, the outlets 27b, 28b, and 29b each constitute a part of the manifold 15b for the corresponding fluid.

In the separator 22A, the hydrogen gas is introduced from the hydrogen gas inlet 27a into the hydrogen gas passage 25A, and is discharged to the hydrogen gas outlet 27b. The same applies to the flow of the coolant. Although not described in detail, in the separator 22B configured similarly to the separator 22A as well, the air flows in its planar direction. In this manner, the hydrogen gas is supplied to the anode electrode 24A facing the hydrogen gas passage 25A in the separator 22A, while the air is supplied to the cathode electrode 24B facing the air passage 25B, causing an electrochemical reaction to take place in the MEA 20, whereby an electromotive force is obtained. Further, by this electrochemical reaction, water is generated on the cathode electrode 24B side, resulting in moisture remaining in the cell 2.

Figure 5:
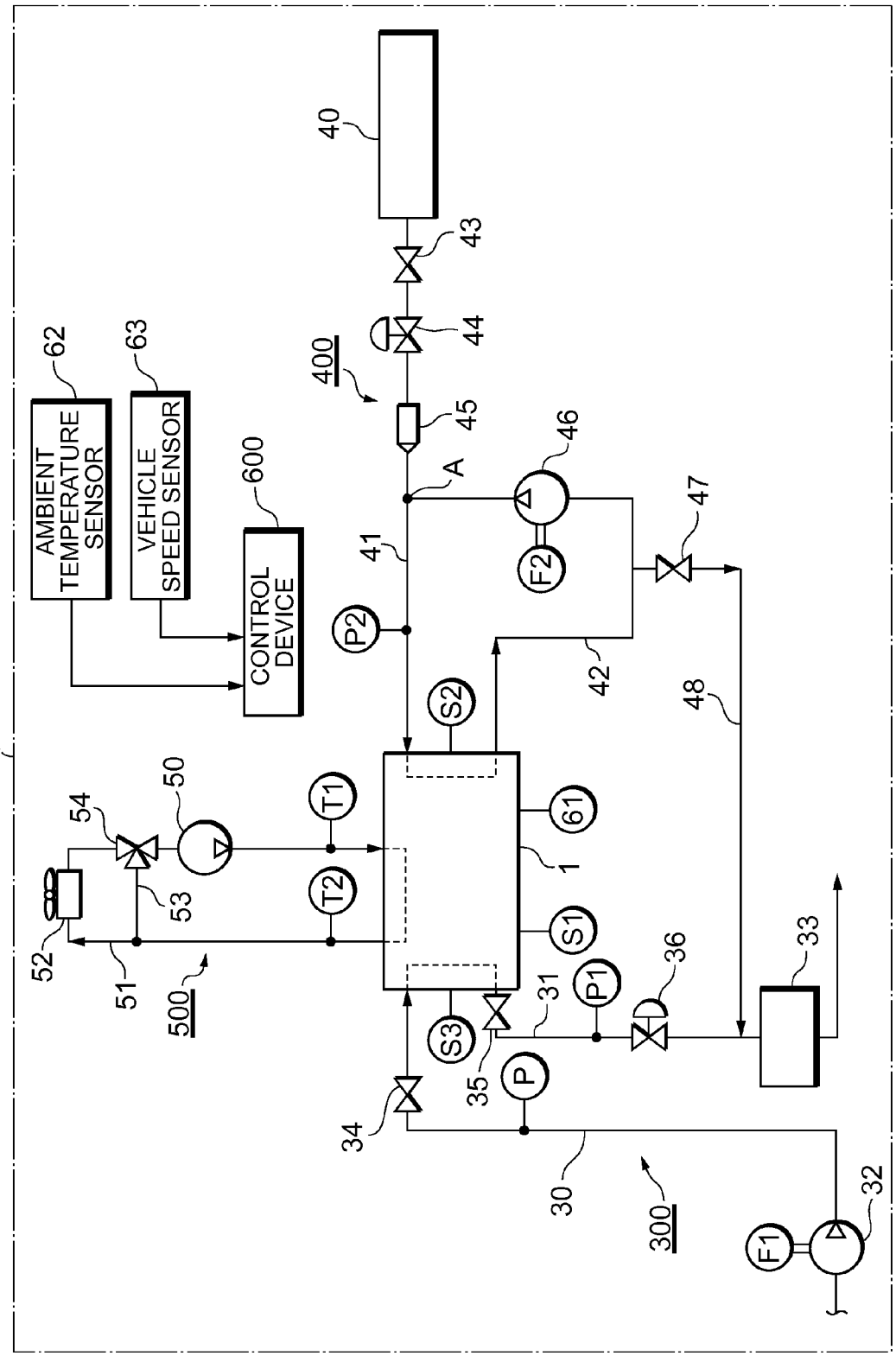
FIG. 5 is a configuration diagram of a fuel cell system.

As shown in FIG. 5, the fuel cell 1 may include a sensor S1 which detects a voltage of each cell 2, a sensor S2 which detects an electric current at the air inlet 28a of each cell 2, and a sensor S3 which detects electricity generated by and output from the fuel cell stack 3.

Hereinafter, a fuel cell system equipped with the above-described fuel cell 1 will be described. As shown in FIG. 5, a fuel cell system 100 may include an air piping system 300, a hydrogen piping system 400, a coolant piping system 500, and a control device 600. The fuel cell system 100 may be mounted on a vehicle, a ship, an airplane, a robot, or any other mobile unit. It may also be used for a stationary power supply. Here, the fuel cell system 100 mounted on an automobile will be described by way of example.

The air piping system 300, which is for supplying air to and discharging air from the fuel cell 1, may include a supply flow path 30, a discharge flow path 31, a compressor 32, a diluter 33, and the like. The compressor 32 pumps the air in the atmosphere through the supply flow path 30 to the fuel cell 1. The air off-gas discharged from the fuel cell 1 flows through the discharge flow path 31 and is diluted by the diluter 33 before being discharged to the outside. The supply flow path 30 is provided with an on-off valve 34 which allows or stops the air supply to the fuel cell 1. A pressure sensor P is provided between the compressor 32 and the on-off valve 34. The discharge flow path 31 is provided with an on-off valve 35 which allows or stops the discharge of the air off-gas from the fuel cell 1, and an air back-pressure regulator 36 which regulates the air back-pressure of the fuel cell 1. Furthermore, a pressure sensor P1 for detecting the air back-pressure is provided in the vicinity of the air back-pressure regulator 36. The compressor 32 is provided with a flow sensor F1 which detects the flow rate of the air supplied to the fuel cell 1.

The hydrogen piping system 400, which is for supplying the hydrogen gas to and discharging the hydrogen gas from the fuel cell 1, includes a hydrogen supply source 40, a supply flow path 41, a circulation flow path 42, a shutoff valve 43, a pressure regulator 44, an injector 45, and the like. The hydrogen gas supplied from the hydrogen supply source 40 is firstly reduced in pressure by the pressure regulator 44, and its flow rate and pressure are adjusted with high precision by the injector 45. Thereafter, the hydrogen gas joins, at a confluence A, with a hydrogen off-gas pumped by a hydrogen pump 46 serving as a gas circulation device on the circulation flow path 42, and is supplied to the fuel cell 1. The circulation flow path 42 is provided with an exhaust valve 47, to which a discharge flow path 48 is connected to branch off from the circulation flow path 42. The discharge flow path 48 is connected to the diluter 33, and the hydrogen off-gas is fed from the exhaust valve 47 through the discharge flow path 48 to the diluter 33, where it is diluted before being discharged to the outside. On the downstream of the confluence A, a pressure sensor P2 is provided which detects the supply pressure of the hydrogen gas to the fuel cell 1. Furthermore, the hydrogen pump 46 is provided with a flow sensor F2. It is noted that in another embodiment, a fuel off-gas may be introduced into a hydrogen diluter or the like, or the circulation flow path 42 may be provided with a gas-liquid separator.

The coolant piping system 500 is for cyclically supplying a coolant (e.g., cooling water) to the fuel cell 1 so as to adjust the temperature of the fuel cell 1. The coolant piping system 500 may include a cooling pump 50, a coolant flow path 51, a radiator 52, a bypass flow path 53, and a switching valve 54. The cooling pump 50 pumps the coolant inside the coolant flow path 51 into the fuel cell 1. The coolant flow path 51 has a temperature sensor T1 provided at the coolant inlet side of the fuel cell 1, and a temperature sensor T2 provided at the coolant outlet side of the fuel cell 1. The radiator 52 is configured to cool the coolant that is discharged from the fuel cell 1. The switching valve 54, which is made up of a rotary valve for example, switches the path for the coolant between the radiator 52 and the bypass flow path 53 as required.

The control device 600 is formed as a microcomputer having a CPU, a ROM, and a RAM provided therein. The control device 600 receives detection information from the sensors which detect pressures, temperatures, flow rates and others of the fluids flowing through the corresponding piping systems 300, 400, and 500. Furthermore, the control device 600 receives detection information from a current sensor 61 which detects a current value of electricity generated by the fuel cell 1, and also receives detection information from an ambient temperature sensor 62, a vehicle speed sensor 63, a throttle position sensor, and others. The control device 600, in accordance with the detection information and others, controls various components in the system 100 (including the compressor 32, the shutoff valve 43, the injector 45, the hydrogen pump 46, the exhaust valve 47, the cooling pump 50, and the switching valve 54), to thereby perform overall control of the operations of the fuel cell system 100.

Moreover, the control device 600 determines humidity states of a plurality of stacked cells 2 (or, the humidity state of the fuel cell stack 3) in the fuel cell 1, on the basis of the detection information from the sensors S1 through S3 and the like for example, and adjusts the humidity in accordance with the determination. Specifically, in the case where at least one of the conditions 1 through 3 stated below is satisfied, the control device 600 determines that the cells present a mixture of dry and overly humid states, in which case the control device 600 performs humidifying control so as to cause all the cells 2 to attain an overly humid state, and thereafter, it performs drying control so as to dry all the cells 2, to thereby allow the fuel cell stack 3 to be recovered to a predetermined humidity state. The conditions 1 through 3 are as follows:

Condition 1. Voltage deviation among the cells is equal to or more than a predetermined threshold value, and a minimum cell voltage is equal to or less than a predetermined threshold value.

Condition 2. The minimum cell voltage is equal to or less than the predetermined threshold value, and electricity generated by and output from the fuel cell is equal to or less than a predetermined threshold value.

Condition 3. The minimum cell voltage is equal to or less than the predetermined threshold value, and an electric current at the air inlet on the cathode side of the cell is equal to or less than a predetermined threshold value.

The reason why it is determined that the fuel cell stack 3 presents the mixture of the dry and overly humid states in the case where at least one of the conditions 1 through 3 is satisfied will now be described.

Figure 6:
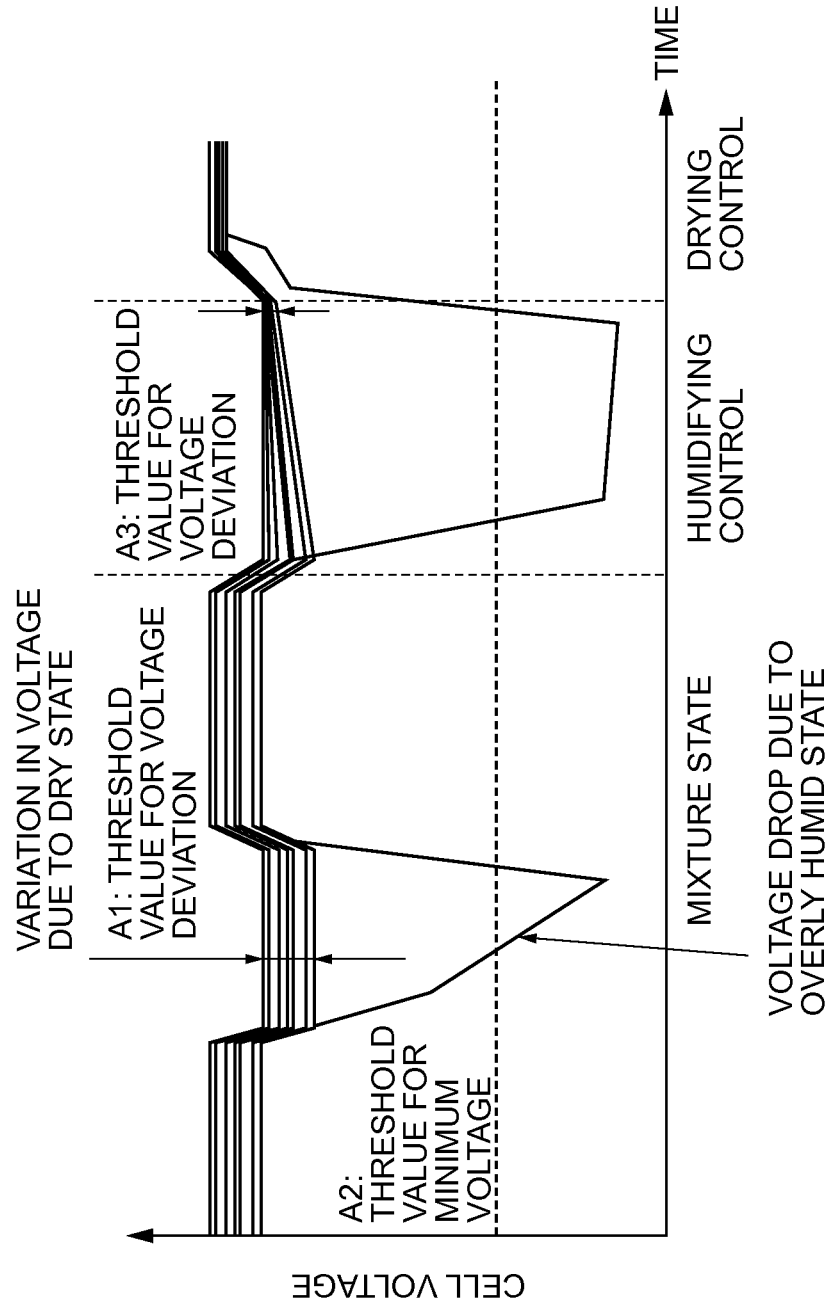
FIG. 6 is a graph showing a change in cell voltage of each cell in a fuel cell stack.

FIG. 6 is a graph illustrating displacement of the cell voltage in each cell 2 in the case where the fuel cell stack 3 suffers the mixture state. It can be seen from this graph that the cell voltages vary in the fuel cell stack 3, with the cell voltages excessively dropping in some of the cells. Therefore, the cells are in the mixture state in the case where the voltage deviation among the cells becomes a predetermined threshold value A1 or more and the minimum cell voltage becomes a predetermined threshold value A2 or lower (Condition 1).

The variation in cell voltage in the fuel cell stack 3 shown in the graph results from the dryness of some of the cells 2. As the cell voltages vary in the fuel cell stack 3, the cell resistance increases, leading to decreased electricity generated by and output from the fuel cell 1. On the other hand, the drop of cell voltage in some of the cells 2 shown in the graph is due to the excessive moisture. Therefore, the cells are in the mixture state in the case where the minimum cell voltage becomes the predetermined threshold voltage A2 or lower and the electricity generated by and output from the fuel cell 1 becomes a predetermined threshold value or less (Condition 2).

In the dry state, the air at the air inlet 28a is lowest in humidity and would likely become dry, causing a reduction in current value at the air inlet 28a. Therefore, the cells are in the mixture state in the case where the minimum cell voltage becomes the predetermined threshold value A2 or lower, which occurs in the overly humid state, and the electric current at the air inlet 28a on the cathode side of the cell 2 becomes a predetermined threshold value or less (Condition 3). It is noted that the dry state alone or the overly humid state alone would not satisfy any of the conditions 1 through 3.

In normal control, the control device 600 performs the humidifying control in the case where the fuel cell stack 3 is in a dry state, while it performs the drying control in the case where the fuel cell stack 3 is in an overly humid state.

Figure 7:
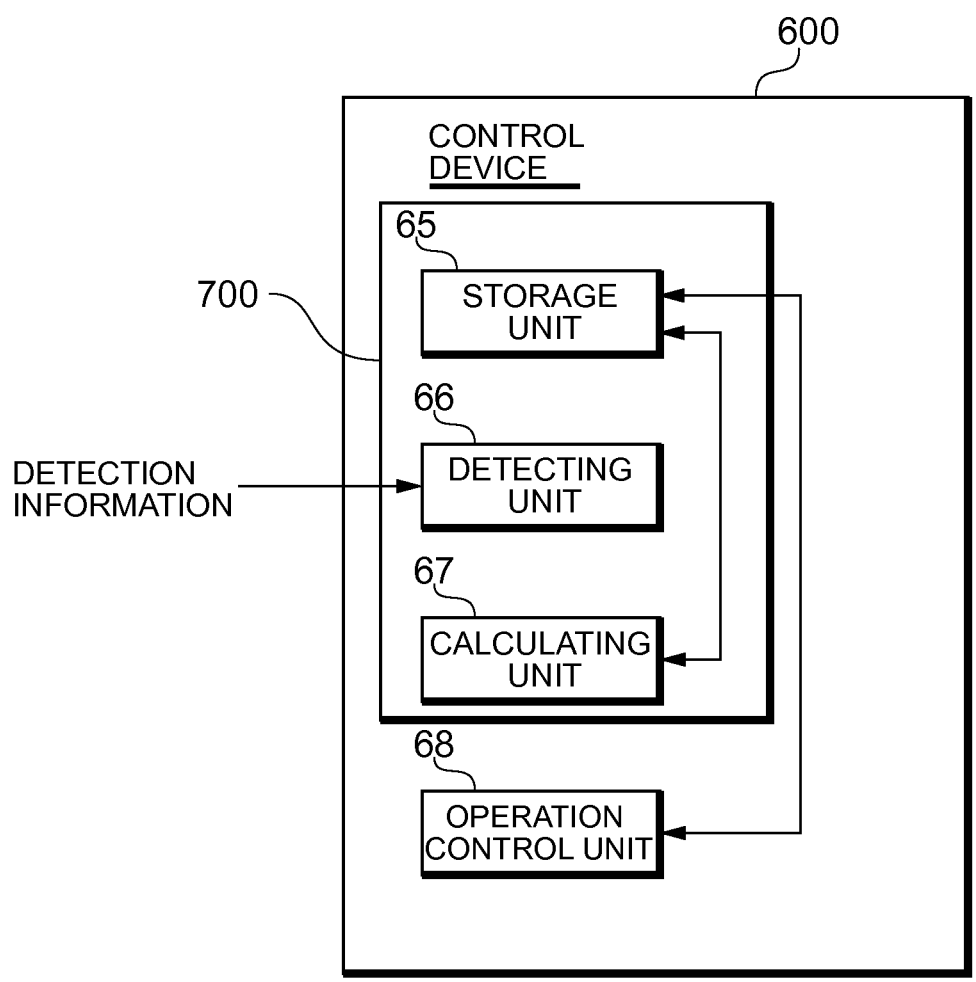
FIG. 7 is a functional block diagram of a control device.

As shown in FIG. 7, the control device 600 may include, as functional blocks for causing the fuel cell stack 3 to be recovered to a predetermined humidity state, a storage unit 65, a detecting unit 66, a calculating unit 67, and an operation control unit 68. The storage unit 65 stores various information as well as various programs for determining the humidity state of the fuel cell stack 3 and for controlling the various components on the basis of the determination. The detecting unit 66 reads detection information of the sensors S1 through S3 and the like for determining the humidity in the cells 2. The calculating unit 67 executes the programs stored in the storage unit 65, on the basis of the information acquired by the detecting unit 66 and the like, to perform calculations necessary for determination of the humidity state of the fuel cell stack 3 and for control of the components based on the determination. The operation control unit 68, on the basis of the calculation results of the calculating unit 67, transmits control commands to the various components so as to control the operations such that the fuel cell stack 3 in the fuel cell 1 attains a desired humidity state. It is noted that in the present embodiment, for example, the storage unit 65, the detecting unit 66, and the calculating unit 67 constitute a determination device 700 for determining the humidity of individual cells in the fuel cell 1.

Figure 8:
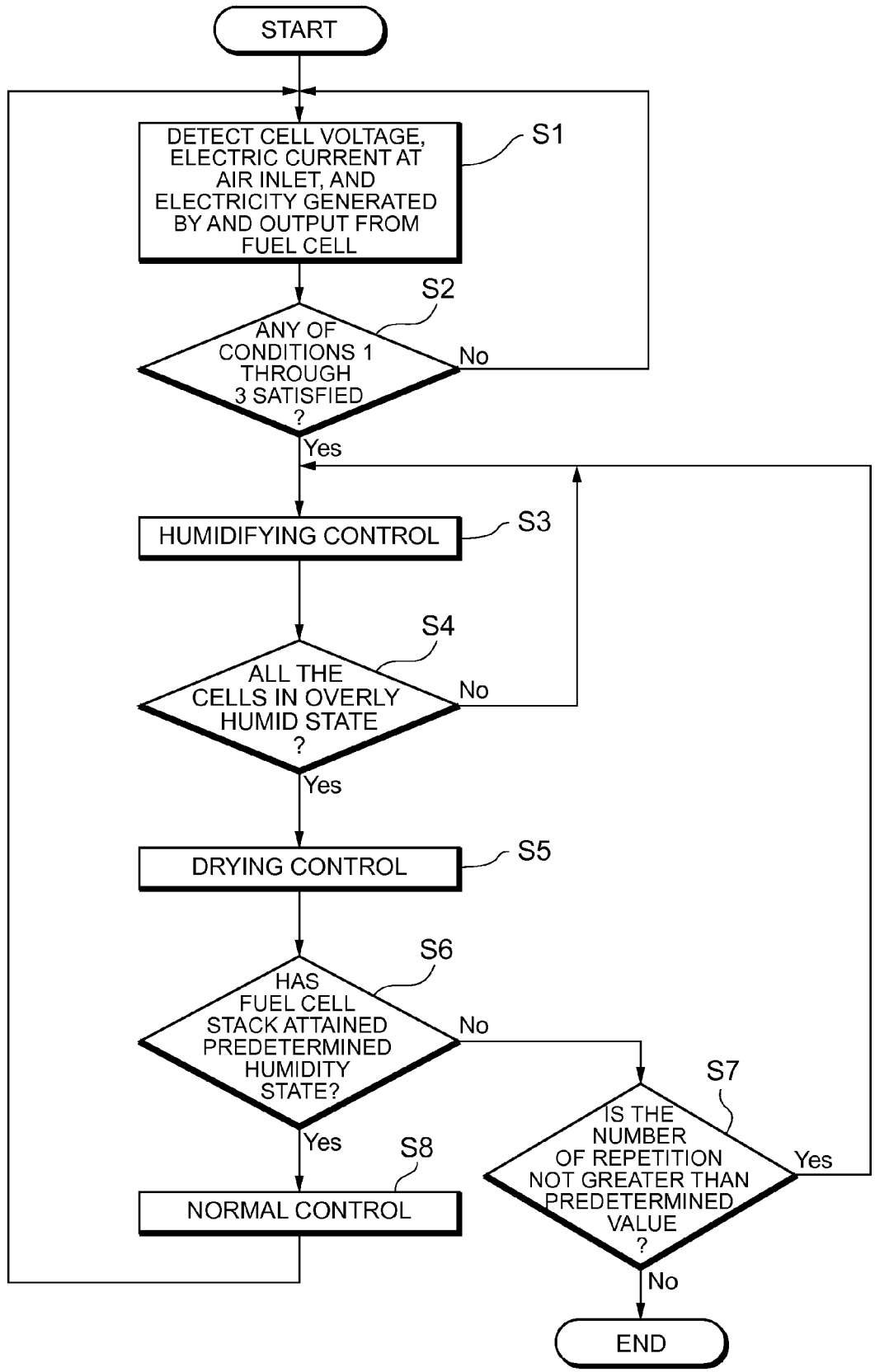
FIG. 8 is a flowchart illustrating a method for controlling the humidity state of the fuel cell stack in the fuel cell.

Hereinafter, a method for controlling the humidity states of the cells (or, the humidity state of the fuel cell stack 3) in the fuel cell 1 in the fuel cell system 100 configured as described above will be described by way of example. FIG. 8 is a flowchart of this exemplary control method.

Firstly, a cell voltage of each cell 2, an electric current at the air inlet 28a in each cell 2, and electricity generated by and output from the fuel cell 1 are detected using the sensors S1 through S3 and the like (step S1).

Next, it is determined whether any of the following conditions 1 through 3 is satisfied (step S2):

condition 1: voltage deviation among the cells 2 is equal to or more than a predetermined threshold value, and a minimum cell voltage is equal to or less than a predetermined threshold value;

condition 2: the minimum cell voltage is equal to or less than the predetermined threshold value, and electricity generated by and output from the fuel cell 1 is equal to or less than a predetermined threshold value; and condition 3: the minimum cell voltage is equal to or less than the predetermined threshold value, and an electric current at the air inlet 28a on the cathode side of the cell 2 is equal to or less than a predetermined threshold value.

It is noted that the threshold values stated in the conditions 1 through 3 are each set to a value obtained in advance through experiments or the like.

Furthermore, it is configured such that the determination of the mixture state of the dry and overly humid states described above is refrained from being made during a starting period of the fuel cell 1, during a high-load operation of the fuel cell 1, and during stop processing of the fuel cell 1. During the starting period of the fuel cell 1, the water temperature is below a predetermined temperature range set for a steady operation, and the gas does not spread satisfactorily through the fuel cell stack 3. Thus, the cell voltages of the individual cells 2 may vary due to a reason other than their humidity states. During the high-load operation of the fuel cell 1, the cell voltages of the individual cells 2 may vary more widely than during the normal-load operation. Furthermore, during the stop processing of the fuel cell 1, purging is performed to expel water from within the fuel cell 1, possibly causing variation in cell voltage of the individual cells 2. Thus, the determination of the mixture state is refrained from being made in the above-described situations, whereby an erroneous determination of the mixture state can be avoided. It is noted that the starting period of the fuel cell refers, for example, to the period from when a start sequence is initiated until when the fuel cell 1 enters a normal power generating state. The high-load operation period refers, for example, to the period in which the fuel cell 1 operates with 50% to 70% or more of the maximum output. The stop processing period of the fuel cell refers, for example, to the period from the start to the end of a shutdown process according to a shutdown instruction.

Figure 9:
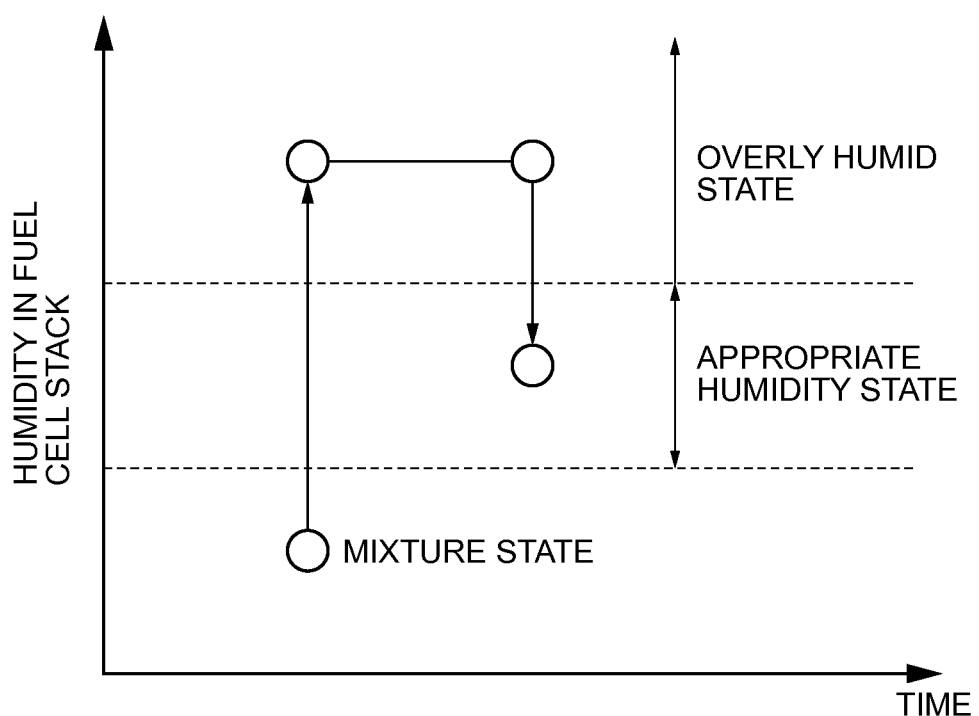
FIG. 9 is a graph showing a change in humidity state of the fuel cell stack.

In the case where at least one of the above conditions 1 through 3 is satisfied, it is determined that the fuel cell stack 3 is in the mixture state of the dry and overly humid states. When this determination has been made, humidifying control is carried out first, as shown in FIG. 9, so as to cause all the cells 2 to attain an overly humid state (step S3). This humidifying control may be carried out by controlling at least one of: air stoichiometric ratio on the cathode electrode 24B side of the cell 2; air back-pressure; water temperature in the cell 2; and electricity generated by and output from the fuel cell 1. Specifically, as for the air stoichiometric ratio, the amount of air supply is reduced under the control of the compressor 32, for example, to thereby reduce the amount of water carried away by the air. As for the air back-pressure, the air back-pressure regulator 36 is used to increase the air back-pressure, to thereby reduce the amount of water carried away by the air. As for the water temperature in the fuel cell stack 3, the coolant piping system 500 is used to decrease the temperature of the coolant and, hence, the temperature of water, for example, to thereby reduce vaporized water. As for the electricity generated and output, the total amount of hydrogen gas supply and/or air supply is increased, for example, to increase the electricity generated and output and, hence, the amount of water generated.

In the normal control, in the event that the cell voltage drops in a particular cell 2, the control is performed immediately to recover the voltage. In contrast, in the humidifying control, such a drop of the cell voltage is permitted because this cell voltage drop is caused by insufficient air due to the excessive moisture, which would not impair the cell 2.

Furthermore, in the humidifying control, the air stoichiometric ratio is adjusted to cause moisture to be discharged from within the cell 2, so as to avoid insufficient air supply caused by water clogging in the air passage 25B in the cell 2. Still further, in the humidifying control, movement of the moisture from the cathode side to the anode side in the cell 2 is restricted so as to avoid insufficient hydrogen gas supply caused by water clogging in the hydrogen gas passage 25A in the cell 2. Specifically, the hydrogen gas pressure on the anode side is increased, for example, so as to restrict the movement of the moisture.

In the humidifying control, discharge of water on the anode side of the cell 2 is promoted so as to avoid insufficient hydrogen gas supply caused by water clogging in the hydrogen gas passage 25A in the cell 2. For promoting the discharge of water, for example at least one of the measures of: increasing the hydrogen gas stoichiometric ratio on the anode side of the cell 2; increasing the water temperature on the anode side of the cell 2; and increasing the frequency of purging on the anode side of the cell 2, is taken. The water temperature on the anode side of the cell 2 may be increased for example by causing the cooling water to circulate through the cooling piping system 500 without passing through the radiator 52.

Next, it is determined whether all the cells 2 have attained the overly humid state (step S4). In the case where all the cells 2 have attained the overly humid state, the cell voltage considerably drops in some of the cells 2, while the variation in cell voltage in the remaining cells becomes small, as shown in FIG. 6. Accordingly, it is determined that all the cells 2 have attained the overly humid state when deviation of cell voltages of the cells 2, except for those in which the voltage has dropped to the threshold value A2 or lower, is equal to or less than a threshold value A3. Otherwise, it is determined that not all the cells 2 have attained the overly humid state, in which case the humidifying control is carried out again.

Once all the cells 2 have attained the overly humid state, drying control is carried out next (step S5). For the drying control, air purge control, for example, is carried out to cause the air to flow through the cell 2. The amount of purge used in the air purge control is set to ensure both the air flow velocity which can expel water from within the cell 2 and the quantity of air which can expel all the water contained in any cell 2 that is suffering a cell voltage drop. Specifically, the air flow velocity v1 is obtained through experiments or the like. The quantity of air Q is calculated such that it satisfies the expressions (1) and (2) shown in FIG. 10. In the expressions, v2 represents the velocity of the air flowing through the cell in a dry state, P1 represents a pressure loss in the cell 2 when it is in the overly humid state, P2 represents a pressure loss in the cell 2 when it is in the dry state, n represents the number of cells suffering a cell voltage drop, $n_{all}$ represents the total number of cells, S represents a cross-sectional area of the passage in the cell, and t represents a purge time. With the air flow velocity v1 predetermined, the quantity of air can be obtained from the expressions (1) and (2).

By this drying control, all the cells 2 are dried, to thereby allow the fuel cell stack 3 to be recovered to a predetermined humidity state. It is then determined whether the fuel cell stack 3 has attained the predetermined humid state (step S6). It may be determined that the fuel cell stack 3 has been recovered to the predetermined humidity state when deviation of the cell voltages has become a predetermined threshold value or less, for example.

If the fuel cell stack 3 has not been recovered to the predetermined humidity state, the process is repeated from the humidifying control. At this time, the number of repetition is counted, and the control is repeated only when the number of repetition is a predetermined value or less. If the number of repetition has exceeded the predetermined value, the control of the humidity state is terminated, and electricity generated by and output from the fuel cell 1 is restricted, for example. If the fuel cell stack 3 has been recovered to the predetermined humidity state, the control is returned to the normal control. In the normal control, the conditions 1 through 3 are checked on a regular basis or on an as-needed basis, and once it is determined that at least one of the conditions 1 through 3 is satisfied, the above-described steps 3 through 6 are repeated.

According to the embodiment described above, it is determined that the cells present the mixture of dry and overly humid states in the case where any of the above-described conditions 1 through 3 is satisfied. This enables the mixture state to be recognized and addressed as appropriate. Furthermore, when it is determined that the cells present the mixture state, the humidifying control is carried out to cause all the cells to attain the overly humid state, and subsequently, the drying control is carried out to dry all the cells 2, to thereby cause the fuel cell stack 3 to be recovered to a predetermined humidity state. This ensures appropriate recovery of the humidity state.

Furthermore, it is configured such that the determination of the mixture state is refrained from being made during the starting period of the fuel cell 1, during the high-load operation of the fuel cell, and during the stop processing of the fuel cell, in which the cell voltages may vary due to a reason other than the humidity states of the cells. This can avoid an erroneous determination of the mixture state.

In the humidifying control, a drop of cell voltage is permitted. Even in the event that the cell voltage of a particular cell 2 that was low in the mixture state further drops, another control for addressing the situation is not conducted, allowing the humidifying control to be continued.

In the humidifying control, at least one of the air stoichiometric ratio on the cathode side of the cell 2, the air backpressure, the temperature of the cooling water, and the electricity generated by and output from the fuel cell 1 is controlled, enabling effective humidifying control. Further, in the humidifying control, the air stoichiometric ratio is adjusted to cause the moisture to be discharged from within the cell 2, to thereby avoid insufficient air supply caused by water clogging in the air passage 25B in the cell 2. This can suitably promote the increase of moisture. It is noted that the air stoichiometric ratio refers to the ratio of the amount of air supply to the amount of air theoretically necessary for reaction.

Furthermore, in the humidifying control, movement of the moisture from the cathode side to the anode side in the cell 2 is restricted to avoid insufficient hydrogen gas supply caused by water clogging in the hydrogen gas passage 25A in the cell 2. This can suitably promote the increase of moisture. For restriction of the moisture movement at this time, the hydrogen gas pressure on the anode side of the cell 2 is increased, ensuring effective restriction of the moisture movement.

In the humidifying control, discharge of water is promoted on the anode side of the cell 2 so as to avoid insufficient hydrogen gas supply caused by water clogging in the hydrogen gas passage 25A in the cell 2. This can suitably promote the increase of moisture. At this time, discharge of water is promoted by taking at least one of the measures of: increasing the hydrogen gas stoichiometric ratio on the anode side of the cell 2, increasing the water temperature, and increasing the purge frequency, so that the discharge of water is promoted appropriately.

The drying control is conducted by air purge control, and the amount of purge used in the air purge control is set to ensure both the air flow velocity which can expel water from within the cell 2 and the quantity of air which can expel all the water contained in any cell 2 suffering a drop of cell voltage. This ensures effective recovery of the humidity state.

In the embodiment described above, it may be configured such that it is determined that the fuel cell stack 3 is in the mixture state of the dry and overly humid states in the case where a condition that a difference between an impedance value of the cell 2 at the center and an impedance value of the cell 2 at an end of the fuel cell stack 3 is equal to or greater than a predetermined threshold value is satisfied in addition to at least one of the conditions 1 through 3. The impedance value of a cell 2 depends on the humidity contained therein. Thus, the accuracy of determination of the mixture state can be improved when it is determined that the fuel cell stack 3 is in the mixture state in the case where the difference between the impedance value of the center cell 2 and the impedance value of the end cell 2 in the fuel cell stack 3 is a predetermined threshold value or greater. It is noted that the impedance value may be detected, for example, by applying an AC signal to a current load to be swept, and by measuring the AC impedance.

While the preferred embodiment of the present invention has been described with reference to the accompanying drawings, the present invention is not restricted thereto. It will be apparent to those skilled in the art that various changes or modifications are conceivable without departing from the scope of the invention as defined in the appended claims. It is understood that such changes or modifications naturally belong to the technical scope of the present invention.

For example, although the fuel cell system 100 to be mounted on a fuel cell vehicle has been described in the above embodiment, the fuel cell system may be mounted on any types of mobile units (including a robot, a ship, an airplane, and the like), besides the fuel cell vehicle. Furthermore, the fuel cell system is applicable to a stationary power generating system that is used as a power-generating facility for a construction (a house, a building, or the like).

DESCRIPTION OF REFERENCE LETTERS

1 fuel cell
2 unit cell
3 fuel cell stack
25A hydrogen gas passage
25B air passage
100 fuel cell system
600 control device

The invention claimed is:

1. A method for controlling humidity states of a plurality of cells stacked in a fuel cell, comprising the steps of:
   determining that the plurality of cells presents a mixture of dry and overly humid states when:
      a minimum voltage value of at least one of the plurality of cells is equal to or less than a predetermined voltage threshold value indicative of an overly humid state, and
      at least one of the following conditions 1 through 3 is satisfied:
         condition 1: at least two of the plurality of cells that do not have a voltage equal to or less than a predetermined voltage threshold value indicative of an overly humid state have a voltage deviation greater than a predetermined voltage deviation threshold value,
         condition 2: electricity generated by and output from the fuel cell is equal to or less than a predetermined electricity generation threshold value, and
         condition 3: an electric current adjacent to an air inlet on a cathode side of at least one of the plurality of cells is equal to or less than a predetermined electric current threshold value;
   wherein if it is determined that the plurality of cells presents the mixture of dry and overly humid states:
      performing humidifying control to cause the plurality of cells to attain an overly humid state, and
      performing drying control to dry the plurality of cells, to thereby cause the plurality of cells to be recovered to a predetermined humidity state.

2. The method for controlling the humidity states of the plurality of cells stacked in the fuel cell according to claim 1, wherein the determination that the plurality of cells presents the mixture of dry and overly humid states is refrained from being made during a starting period of the fuel cell, during a high-load operation of the fuel cell, and during stop processing of the fuel cell.

3. The method for controlling the humidity states of the plurality of cells stacked in the fuel cell according to claim 1, wherein it is determined that the plurality of cells presents the mixture of the dry and overly humid states in the case where, in addition to at least one of the conditions 1 through 3, a condition that a difference between an impedance value of the fuel cell at the center in a stack direction and an impedance value of the fuel cell at an end in the stack direction is equal to or greater than a predetermined impedance differential threshold value is satisfied.

4. The method for controlling the humidity states of the plurality of cells stacked in the fuel cell according to claim 1, wherein in the humidifying control, a drop of cell voltage is permitted.

5. The method for controlling the humidity states of the plurality of cells stacked in the fuel cell according to claim 1, wherein in the humidifying control, at least one of air stoichiometric ratio on a cathode side of the cell, air back-pressure, temperature of cooling water of the fuel cell, and electricity generated by and output from the fuel cell is controlled.

6. The method for controlling the humidity states of the plurality of cells stacked in the fuel cell according to claim 5, wherein in the humidifying control, the air stoichiometric ratio is adjusted to cause moisture to be discharged from within the cell, to thereby avoid insufficient air supply caused by water clogging in an air passage in the cell.

7. The method for controlling the humidity states of the plurality of cells stacked in the fuel cell according to claim 1, wherein in the humidifying control, movement of moisture from a cathode side to an anode side in the cell is restricted so as to avoid insufficient hydrogen gas supply caused by water clogging in a hydrogen gas passage in the cell.

8. The method for controlling the humidity states of the plurality of cells stacked in the fuel cell according to claim 7, wherein a hydrogen gas pressure on the anode side of the cell is increased so as to restrict the movement of the moisture.

9. The method for controlling the humidity states of the plurality of cells stacked in the fuel cell according to claim 1, wherein in the humidifying control, discharge of water is promoted on an anode side of the cell so as to avoid insufficient hydrogen gas supply caused by water clogging in a hydrogen gas passage in the cell.

10. The method for controlling the humidity states of the plurality of cells stacked in the fuel cell according to claim 9, wherein at least one of the measures of: increasing a hydrogen gas stoichiometric ratio on the anode side of the cell, increasing a water temperature, and increasing the frequency of purge is taken to promote the discharge of water.

11. The method for controlling the humidity states of the plurality of cells stacked in the fuel cell according to claim 1, wherein
   the drying control is performed by air purge control, and
   the amount of purge used in the air purge control is set to ensure both an air flow velocity which can expel water from within the cell and the quantity of air which can expel all the water contained in any cell suffering a drop of cell voltage.

12. An apparatus for controlling humidity states of a plurality of cells stacked in a fuel cell,
   the apparatus comprising a controller programmed to
      determine that the plurality of cells presents a mixture of dry and overly humid states when:
         a minimum voltage value of at least one of the plurality of cells is equal to or less than a predetermined voltage threshold value indicative of an overly humid state, and
         at least one of the following conditions 1 through 3 is satisfied:
            condition 1: at least two of the plurality of cells that do not have a voltage equal to or less than a predetermined voltage threshold value indicative of an overly humid state have a voltage deviation greater than a predetermined voltage deviation threshold value, condition 2: electricity generated by and output from the fuel cell is equal to or less than a predetermined electricity generation threshold value, and condition 3: an electric current adjacent to an air inlet on a cathode side of at least one of the plurality of cells is equal to or less than a predetermined electric current threshold value;

wherein if it is determined that the plurality of cells presents the mixture of dry and overly humid states:

perform humidifying control to cause the plurality of the cell to attain an overly humid state, and perform drying control to dry the plurality of cells, to thereby cause the plurality of cells to be recovered to a predetermined humidity state.

13. The apparatus for controlling the humidity states of the plurality of cells stacked in the fuel cell according to claim 12, wherein the determination that the plurality of cells presents the mixture of dry and overly humid states is refrained from being made during a starting period of the fuel cell, during a high-load operation, of the fuel cell, and during stop processing of the fuel cell.

14. The apparatus for controlling the humidity states of the plurality of cells stacked in the fuel cell according to claim 12, wherein it is determined that the plurality of cells presents the mixture of the dry and overly humid states in the case where, in addition to at least one of the conditions 1 through 3, a condition that a difference between an impedance value of the cell at the center in a stack direction and an impedance value of the cell at an end in the stack direction is equal to or greater than a predetermined impedance differential threshold value is satisfied.

15. The apparatus for controlling the humidity states of the plurality of cells stacked in the fuel cell according to claim 12, wherein in the humidifying control, a drop of cell voltage is permitted.

16. The apparatus for controlling the humidity states of the plurality of cells stacked in the fuel cell according to claim 12, wherein in the humidifying control, at least one of air stoichiometric ratio on a cathode side of the fuel cell, air backpressure, temperature of cooling water of the fuel cell, and electricity generated by and output from the fuel cell is controlled.

17. The apparatus for controlling the humidity states of the plurality of cells stacked in the fuel cell according to claim 16, wherein in the humidifying control, the air stoichiometric ratio is adjusted to cause moisture to be discharged from within the fuel cell, to thereby avoid insufficient air supply caused by water clogging in an air passage in the fuel cell.

18. The apparatus for controlling the humidity states of the plurality of cells stacked in the fuel cell according to claim 12, wherein in the humidifying control, movement of moisture from a cathode side to an anode side in the fuel cell is restricted so as to avoid insufficient hydrogen gas supply caused by water clogging in a hydrogen gas passage in the fuel cell.

19. The apparatus for controlling the humidity states of the plurality of cells stacked in the fuel cells according to claim 18, wherein the controller is further programmed to increase a hydrogen gas pressure on the anode side of the fuel cell so as to restrict the movement of moisture.

20. The apparatus for controlling the humidity states of the plurality of cells stacked in the fuel cell according to claim 12, wherein in the humidifying control, discharge of water is promoted on an anode side of the fuel cell so as to avoid insufficient hydrogen gas supply caused by water clogging in a hydrogen gas passage in the fuel cell.

21. The apparatus for controlling the humidity states of the plurality of cells stacked in the fuel cell according to claim 20, wherein the controller is further programmed to take at least one of the measures of; increasing a hydrogen gas stoichiometric ratio on the anode side of the fuel cell, increasing a water temperature, and increasing the frequency of purge to promote the discharge of water.

22. The apparatus for controlling the humidity states of the plurality of cells stacked in the fuel cell according to claim 12, wherein the drying control is performed by air purge control, and the amount of purge used in the air purge control is set to ensure both an air flow velocity which can expel water from within the cell and the quantity of air which can expel all the water contained in any of the plurality of cells suffering a drop of cell voltage.

23. A fuel cell system, comprising a fuel cell, and the apparatus for controlling the humidity states of the plurality of cells stacked in the fuel cell according to claim 12.

\* \* \* \* \*